US012171267B2

(12) United States Patent
Oh

(10) Patent No.: US 12,171,267 B2
(45) Date of Patent: Dec. 24, 2024

(54) HEATER FOR CIGARETTE-TYPE ELECTRONIC CIGARETTE DEVICE, AND CIGARETTE-TYPE ELECTRONIC CIGARETTE DEVICE INCLUDING THE SAME

(71) Applicant: AMOSENSE CO., LTD., Cheonan-si (KR)

(72) Inventor: Chang-Woo Oh, Gimpo-si (KR)

(73) Assignee: AMOSENSE CO., LTD., Cheonan-si (KR)

( * ) Notice: Subject to any disclaimer, the term of this patent is extended or adjusted under 35 U.S.C. 154(b) by 736 days.

(21) Appl. No.: 17/430,503

(22) PCT Filed: Feb. 7, 2020

(86) PCT No.: PCT/KR2020/001750
§ 371 (c)(1),
(2) Date: Aug. 12, 2021

(87) PCT Pub. No.: WO2020/166888
PCT Pub. Date: Aug. 20, 2020

(65) Prior Publication Data

US 2022/0132931 A1 May 5, 2022

(30) Foreign Application Priority Data

Feb. 14, 2019 (KR) ........................ 10-2019-0017243
Feb. 7, 2020 (KR) ........................ 10-2020-0014625

(51) Int. Cl.
*A24F 40/465* (2020.01)
*A24F 40/20* (2020.01)
(Continued)

(52) U.S. Cl.
CPC ............ *A24F 40/465* (2020.01); *A24F 40/20* (2020.01); *H05B 6/105* (2013.01); *H05B 6/36* (2013.01)

(58) Field of Classification Search
CPC ....... A24F 40/465; A24F 40/20; H05B 6/105; H05B 6/36
See application file for complete search history.

(56) References Cited

U.S. PATENT DOCUMENTS 10,405,584 B2 * 9/2019 Chen ...................... H05B 6/105
10,758,686 B2 * 9/2020 Reevell ................ A61M 11/042
(Continued)

FOREIGN PATENT DOCUMENTS

KR 10-2018-0033295 A 4/2018
KR 10-2018-0034640 A 4/2018
(Continued)

OTHER PUBLICATIONS

International Search Report issued in PCT/KR2020/001750 dated May 28, 2020, 2 pages.
(Continued)

*Primary Examiner* — Thanh Tam T Le
(74) *Attorney, Agent, or Firm* — ROTHWELL, FIGG, ERNST & MANBECK, P.C.

(57) ABSTRACT

Provided is a heater for a cigarette-type electronic cigarette device. A heater for a cigarette-type electronic cigarette device according to an exemplary embodiment of the present invention is configured to a circumference of a cigarette inserted thereinto by a predetermined length and includes a heating member that is disposed to surround a circumference of the cigarette when the cigarette is inserted and is heated through an eddy current induced by electromagnetic induction to heat the cigarette, a heat insulation member that is disposed to surround a circumference of the heating member
(Continued)

and blocks the heat generated by the heating member from moving to the outside, and a coil member that is wound multiple times around a circumference of the heat insulation member and that generates a magnetic field that causes electromagnetic induction to the heating member when power is applied.

9 Claims, 10 Drawing Sheets

(51) Int. Cl.
*H05B 6/10* (2006.01)
*H05B 6/36* (2006.01)

(56) References Cited

U.S. PATENT DOCUMENTS

| | | | | |
|---|---|---|---|---|
| 10,791,765 | B2 * | 10/2020 | Li | A24F 40/57 |
| 10,881,144 | B2 * | 1/2021 | Batista | A61M 15/06 |
| 11,000,073 | B2 * | 5/2021 | Hu | H05B 6/06 |
| 11,234,457 | B2 * | 2/2022 | Mironov | A24D 1/002 |
| 11,240,885 | B2 * | 2/2022 | Fursa | A24F 40/465 |
| 11,277,886 | B2 * | 3/2022 | Stura | A24F 40/57 |
| 11,363,840 | B2 * | 6/2022 | Courbat | A24F 40/48 |
| 11,375,753 | B2 * | 7/2022 | Fursa | A24F 40/465 |
| 11,375,754 | B2 * | 7/2022 | Batista | H05B 6/105 |
| 11,433,193 | B2 * | 9/2022 | Rogan | A61M 11/042 |
| 11,478,018 | B2 * | 10/2022 | Mironov | H05B 6/108 |
| 11,596,177 | B2 * | 3/2023 | Wu | H05B 6/10 |
| 11,606,846 | B2 * | 3/2023 | Stura | A24F 40/485 |
| 11,793,239 | B2 * | 10/2023 | Courbat | A24F 40/50 |
| 11,869,504 | B2 * | 1/2024 | Maxwell | G06F 16/9558 |
| 2017/0055580 | A1 | 3/2017 | Blandino et al. | |
| 2017/0055583 | A1 | 3/2017 | Blandino et al. | |
| 2018/0125119 | A1 | 5/2018 | Cadieux et al. | |
| 2018/0310622 | A1 | 11/2018 | Mironov et al. | |

FOREIGN PATENT DOCUMENTS

| | | | |
|---|---|---|---|
| KR | 10-2018-0069895 | A | 6/2018 |
| KR | 20180111460 | A | 10/2018 |
| WO | 2018/041450 | A1 | 3/2018 |

OTHER PUBLICATIONS

Extended European Search Report dated Nov. 8, 2022 issued in the corresponding European Patent Application No. 20755252.2, 7 pages.

* cited by examiner

HEATER FOR CIGARETTE-TYPE ELECTRONIC CIGARETTE DEVICE, AND CIGARETTE-TYPE ELECTRONIC CIGARETTE DEVICE INCLUDING THE SAME

CROSS REFERENCE TO RELATED APPLICATION

This application is the national phase entry of International Application No. PCT/KR2020/001750, filed Feb. 7, 2020, which is based upon and claims priority to Korean Patent Applications 10-2019-0017243, filed Feb. 14, 2019 and Korean Patent Applications 10-2020-0014625, filed Feb. 7, 2020, the entire contents of which are incorporated herein by reference.

TECHNICAL FIELD

The present invention relates to a heater for a cigarette-type electronic cigarette device and a cigarette-type electronic cigarette device including the same.

BACKGROUND

Electronic cigarette devices generate aerosols by heating or vaporizing leaf tobacco products, leaf tobacco extracts, nicotine-free liquid materials, and the like. Accordingly, when a user inhales the aerosol generated by the electronic cigarette device through an intake of the electronic cigarette device while gripping the electronic cigarette device, the aerosol may be discharged into a mouth of the user through the intake.

As a part thereof, cigarette-type electronic cigarette devices using a fumigation method, which heats cigarettes made of tobacco leaves, are being developed. Such cigarette-type electronic cigarette devices use a method of generating smoking vapor by heating the cigarettes through heaters. Accordingly, the cigarette-type electronic cigarette devices have the advantage of solving the problem of misuse of liquid materials used in liquid electronic cigarette devices while providing a taste similar to that of the existing cigarette.

However, since the cigarette-type electronic cigarette devices according to the related art use ceramic materials as heaters, a large amount of power consumption is required to maintain the temperature for heating the cigarettes.

Accordingly, the cigarette-type electronic cigarette device according to the related art has a limitation in that the usage time of a battery is very short.

SUMMARY OF THE INVENTION

The present invention is directed to providing a heater for a cigarette-type electronic cigarette device capable of reducing power consumption by heating a cigarette through an induction heating method and a cigarette-type electronic cigarette device including the same.

One aspect of the present invention provides a heater for a cigarette-type electronic cigarette device, the heater configured to heat a circumference of a cigarette inserted thereinto by a predetermined length, the heater including a heating member that is disposed to surround a circumference of the cigarette when the cigarette is inserted and is heated through an eddy current induced by electromagnetic induction to heat the cigarette, a heat insulation member that is disposed to surround a circumference of the heating member and blocks the heat generated by the heating member from moving outward, and a coil member that is wound multiple times around a circumference of the heat insulation member and that generates a magnetic field that causes the electromagnetic induction to the heating member when power is applied.

The heating member may be a hollow metal tube made of a metal material. The metal tube may be made of an iron-based metal.

A predetermined gap may be formed between an outer surface of the metal tube and an inner surface of the heat insulation member facing each other.

The heating member may be a metal pattern patterned in the inner surface of the heat insulation member.

The heating member may have an exposed surface on which a heat radiation coating layer for increasing heat emissivity is formed.

The heat insulation member may be made of heat-resistant glass or a heat-resistant polymer resin.

The heat insulation member may include a hollow glass bead.

The heat insulation member may have a hollow tubular shape. The heat insulation member may include a first tube having a hollow and a second tube disposed to surround the first tube, and an air layer may be formed between the first tube and the second tube.

The heater may further include a shielding member disposed to surround the coil member so as to shield the magnetic field generated by the coil member.

The above-described heater for a cigarette-type electronic cigarette device may be applied to a cigarette-type electronic cigarette.

According to the present invention, a heating member for heating a cigarette is heated through an electromagnetic induction method, and thus the amount of power consumed to maintain a heating temperature at which the cigarette may be heated can be reduced. Accordingly, a battery charging cycle or a battery replacement cycle of the electronic cigarette device can be increased.

DETAILED DESCRIPTION OF THE INVENTION

Figure 1:
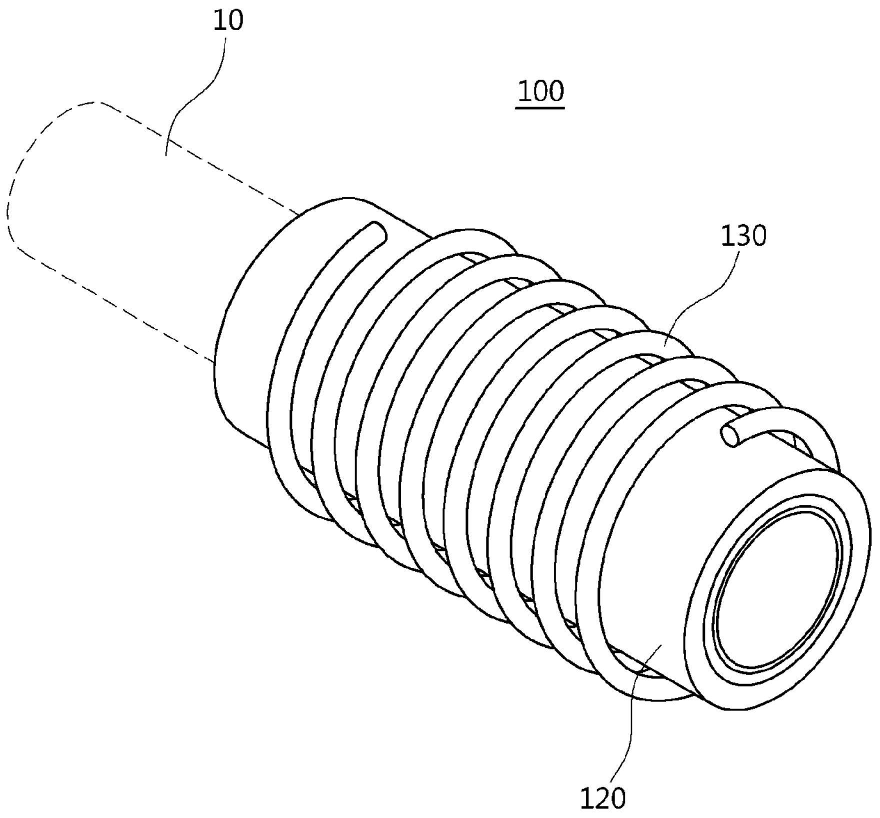
FIG. 1 is an external view showing a heater for a cigarette-type electronic cigarette device according to a first embodiment of the present invention.

Hereinafter, embodiments of the present invention will be described in detail with reference to the accompanying drawings so that those skilled in the art to which the present invention pertains may easily implement the present invention. The present invention may be implemented in various different forms and is not limited the embodiments described herein. In the drawings, parts irrelevant to the description are omitted in order to clearly describe the present invention, and the same or similar reference numerals are assigned to the same or similar components throughout the specification.

Figure 10:
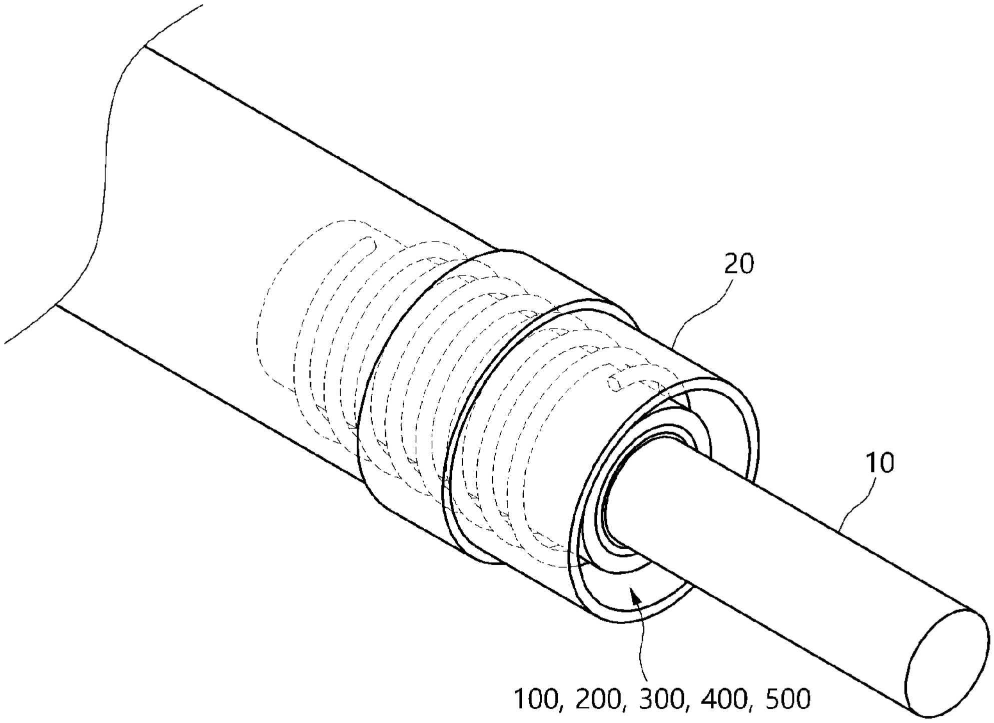
FIG. 10 is an application state diagram of a heater for a cigarette-type electronic cigarette device according to the present invention.

As shown in FIG. 10, a heater 100, 200, 300, 400, or 500 for a cigarette-type electronic cigarette device according to an embodiment of the present invention may be installed on a side of an insertion hole 20 into which a cigarette 10 is inserted in a cigarette-type electronic cigarette device and may receive power supplied from the cigarette-type electronic cigarette device.

Accordingly, when the power is applied to the heater 100, 200, 300, 400, or 500 for a cigarette-type electronic cigarette device in a state in which the cigarette 10 is inserted into the insertion hole 20, the heater 100, 200, 300, 400, or 500 for a cigarette-type electronic cigarette device according to one embodiment of the present invention may generate heat for heating the cigarette 10.

Accordingly, steam for smoking may be generated from the cigarette 10, and a user may smoke by inhaling the steam generated from the cigarette 10.

In this case, when a part of the total length of the cigarette 10 is inserted into the insertion hole 20, a part of the cigarette 10 inserted into the insertion hole 20 may be inserted into the heater 100, 200, 300, 400, or 500 for a cigarette-type electronic cigarette device according to one embodiment of the present invention.

Accordingly, a circumferential surface of the part of the cigarette 10 inserted into the insertion hole 20 may be heated through the heater 100, 200, 300, 400, or 500 for a cigarette-type electronic cigarette device.

In addition, the heater 100, 200, 300, 400, or 500 for a cigarette-type electronic cigarette device according to one embodiment of the present invention may heat the cigarette 10 using heat generated in an induction heating method.

To this end, as shown in FIGS. 1 to 7, the heater 100, 200, 300, or 400 for a cigarette-type electronic cigarette device according to one embodiment of the present invention includes a heating member 110 or 210, a heat insulation member 120 or 220, and a coil member 130.

When the power is applied to the coil member 130, the heating member 110 or 210 may be heated by loss of eddy current by generating the eddy current due to electromagnetic induction by an alternating current (AC) flowing along the coil member 130. Accordingly, the heating member 110 or 210 may heat the cigarette 10 through the heat generated by the loss of the eddy current.

To this end, the heating member 110 or 210 may be configured as a conductor so that the heat may be generated through the loss of the eddy current generated due to the electromagnetic induction when the power is applied.

Accordingly, the heater 100, 200, 300, or 400 for a cigarette-type electronic cigarette device according to one embodiment of the present invention may heat the circumferential surface of the cigarette 10 through the induction heating method due to the electromagnetic induction, and thus power consumption during the heating can be reduced, and a time during which the cigarette 10 may be heated can be increased.

That is, the heater 100, 200, 300, or 400 for a cigarette-type electronic cigarette device according to one embodiment of the present invention may reduce the amount of power consumed to maintain a heating temperature at which the cigarette may be heated. Accordingly, a battery charging cycle or a battery replacement cycle of the electronic cigarette device can be increased.

An electromagnetic induction heating method is a heating method using thermal energy converted from electrical energy by the electromagnetic induction and is a heating method using Joule heat generated using a material to be heated when a secondary current induced by the electromagnetic induction flows in the material to be heated. Since such electromagnetic induction heating is well-known, a detailed description thereof will be omitted.

In addition, the coil member 130 may be electrically connected to an electronic cigarette device body and may receive power from the electronic cigarette device body.

In this case, the heating member 110 or 210 may have a space for accommodating the inserted cigarette 10 when the cigarette 10 is inserted into the insertion hole 20, and the circumference of the cigarette 10 inserted into the space may be surrounded by the heating member 110 or 210.

Accordingly, when a part of the entire length of the cigarette 10 is inserted into the space formed in the heating member 110 or 210 through the insertion hole 20, a circumferential surface of the part of the inserted cigarette 10 may face an inner surface of the heating member 110 or 210.

As a result, the part of the cigarette 10 inserted into the space surrounded by the heating member 110 or 210 may be entirely heated from the outside in a circumferential direction, and thus a heating area may be widened.

In addition, the entire circumference of the part of the cigarette 10 inserted into the space surrounded by the heating member 110 or 210 may face the inner surface of the heating member 110 or 210, and thus the entire circumferential surface can be uniformly heated.

As an example, as shown in FIGS. 2 to 5, the heating member 110 may be a hollow metal tube made of a metal material. As a non-limiting example, the metal may be an iron-based metal such as SUS304, SUS430, or stainless steel.

Accordingly, when a partial length of the cigarette 10 is inserted through the insertion hole 20, the inserted cigarette 10 may be inserted into the metal tube.

Figure 2:
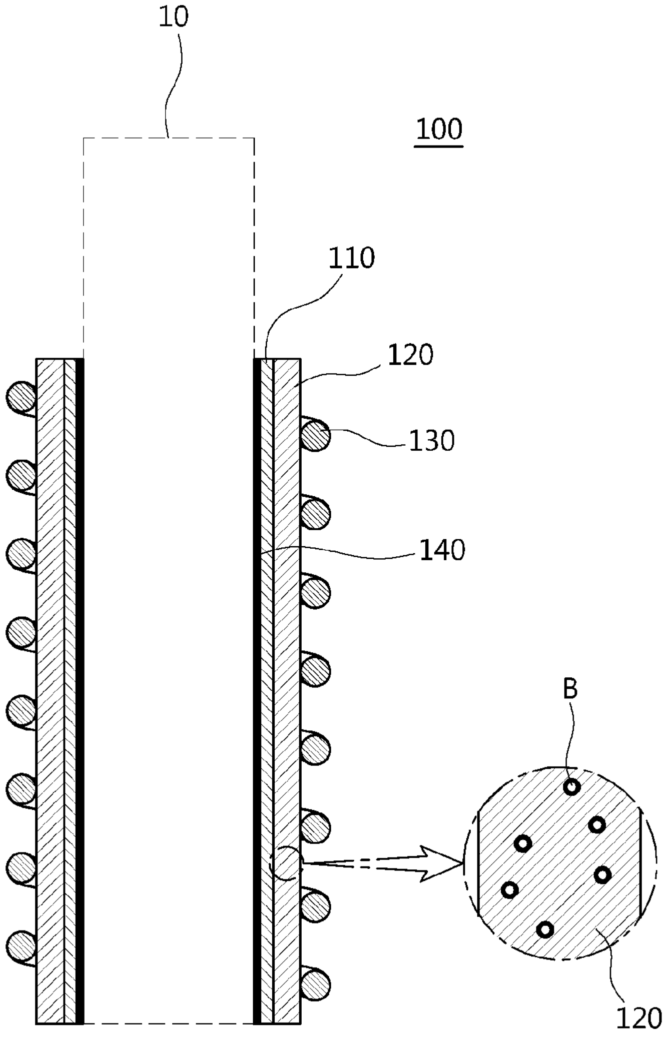
FIG. 2 is a sectional view of FIG. 1.
Figure 4:
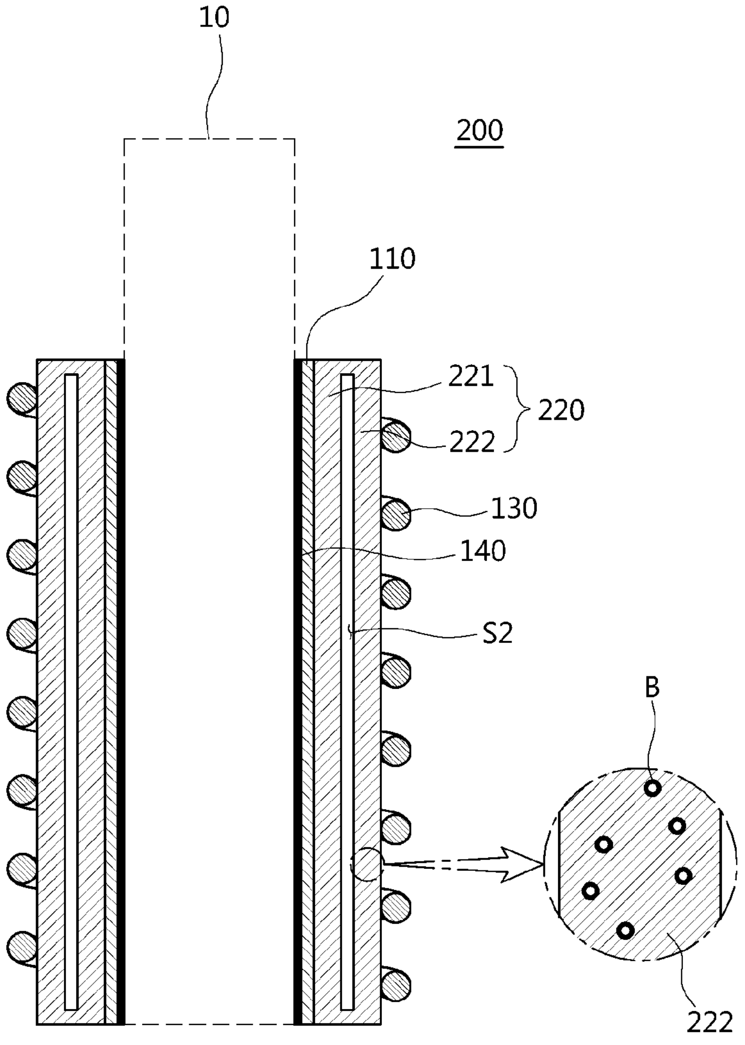
FIG. 4 is a sectional view showing a heater for a cigarette-type electronic cigarette device according to a second embodiment of the present invention.

In this case, as shown in FIGS. 2 and 4, the heating member 110 may be disposed so that an outer surface thereof is in contact with an inner surface of the heat insulation member 120 or 220, and the heating member 110 may be fixed to the inner surface of the heat insulation member 120 or 220 through a fitting method or a bonding method.

Figure 3:
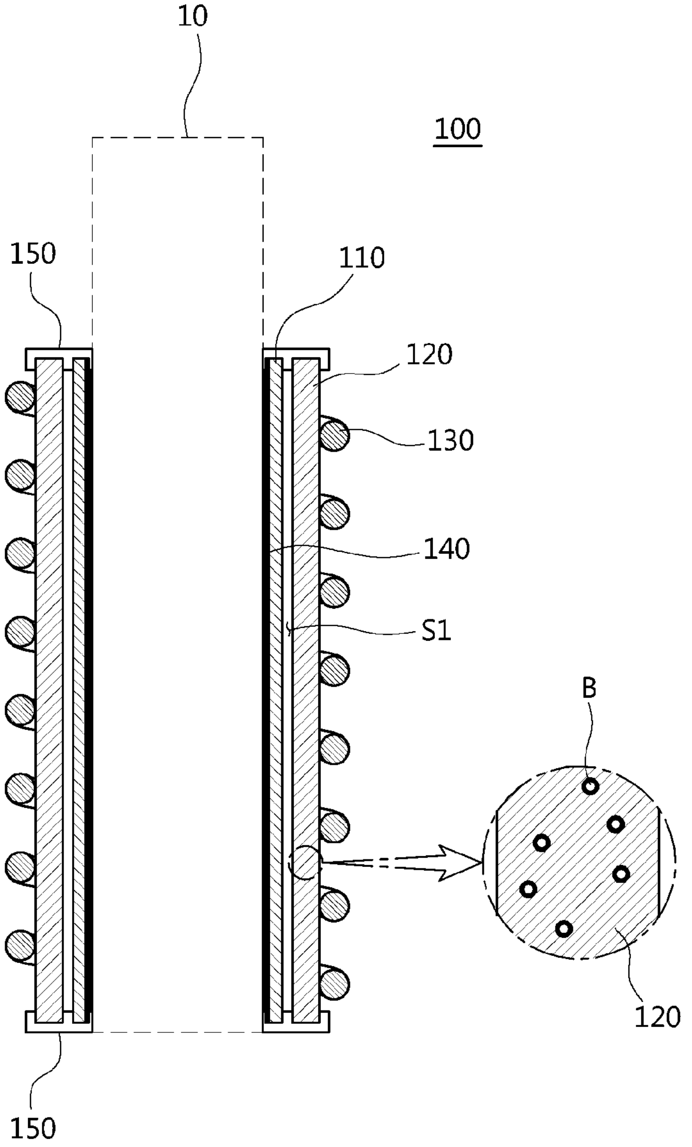
FIG. 3 is a sectional view showing a modified example of FIG. 2.
Figure 5:
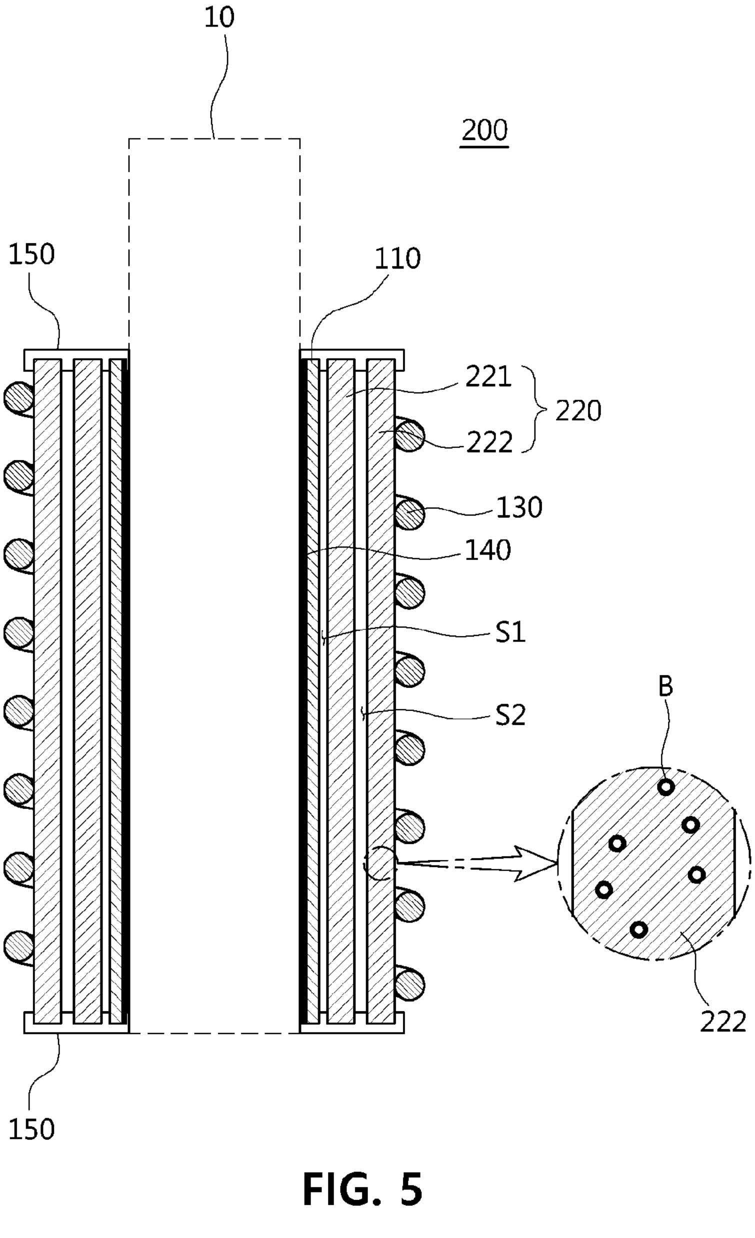
FIG. 5 is a sectional view showing a modified example of FIG. 4.

Alternatively, as shown in FIGS. 3 and 5, the heating member 110 may be disposed so that a predetermined gap SI is formed between an outer surface of the metal tube and the inner surface of the heat insulation member 120 or 220 facing each other.

Accordingly, an air layer may be formed in the gap SI, and the air layer existing in the gap SI may block heat of the heating member 110, which is generated by the induction heating when power is applied, from moving outward.

As a result, as the heat generated by the induction heating in the heating member 110 may be concentrated toward the cigarette 10 inserted into the heating member 110, the cigarette 10 can be more effectively heated, and the heat can be prevented from being transferred to the user.

In this case, the heating member 110 and the heat insulation member 120 or 220 may be fixed to each other through a separate fixing member 150.

Figure 6:
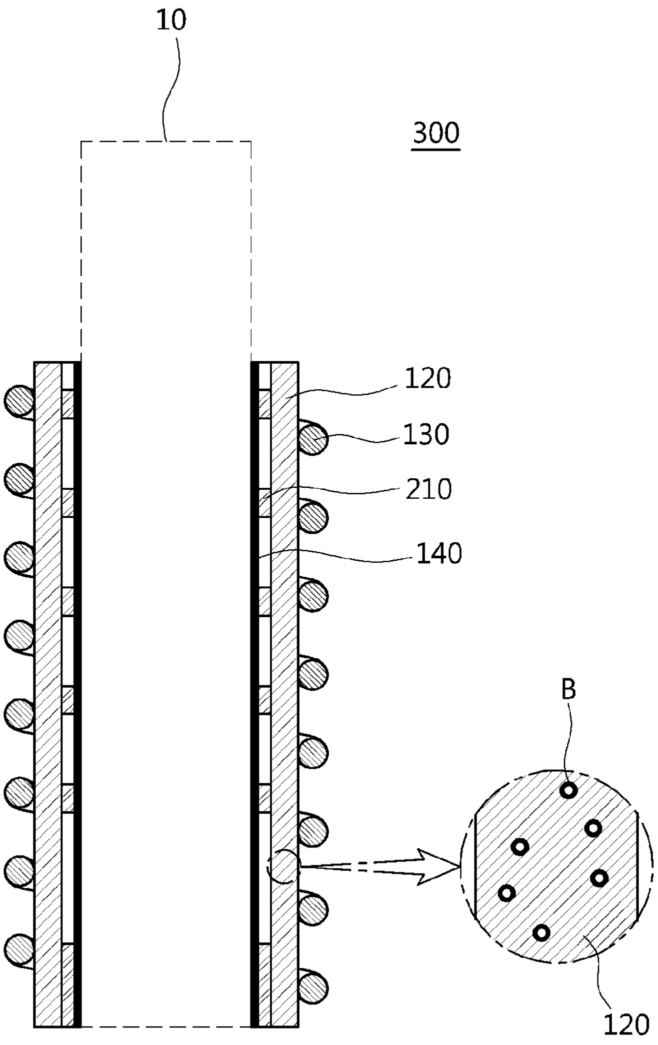
FIG. 6 is a sectional view showing a heater for a cigarette-type electronic cigarette device according to a third embodiment of the present invention.
Figure 7:
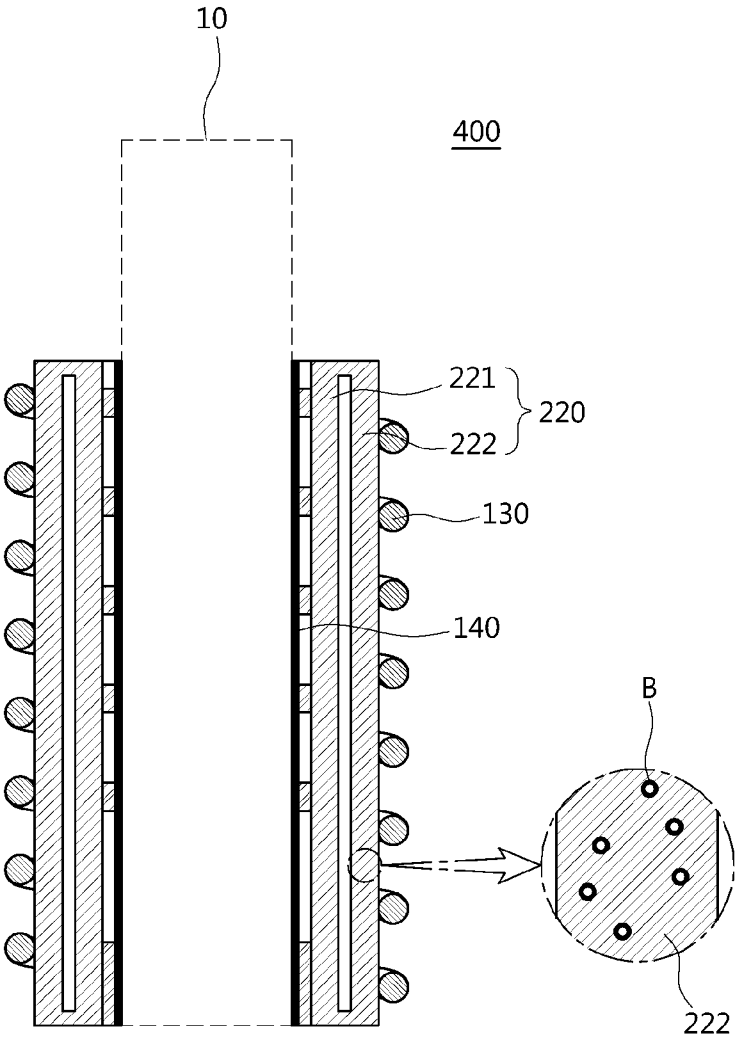
FIG. 7 is a sectional view showing a heater for a cigarette-type electronic cigarette device according to a fourth embodiment of the present invention.
Figure 8:
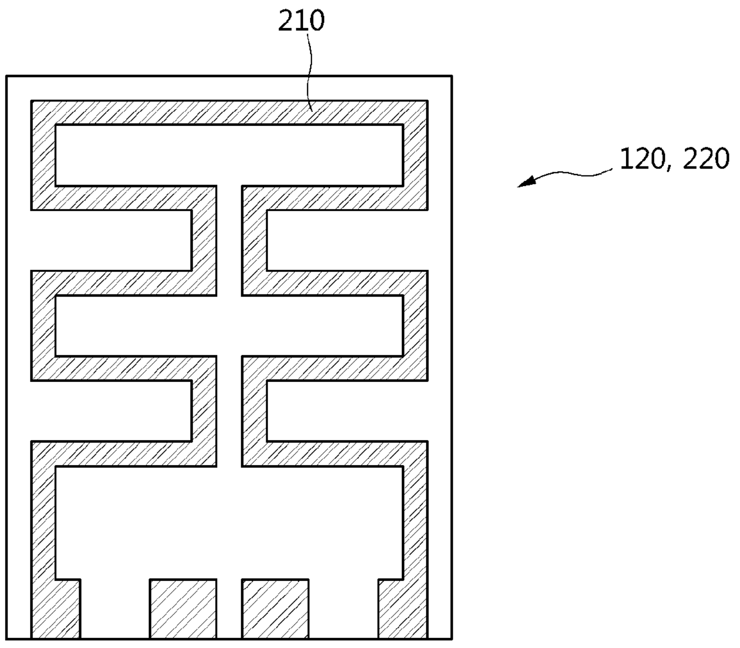
FIG. 8 is a development view showing a pattern of a heating member that may be applied to FIGS. 6 and 7.

As another example, as shown in FIGS. 6 and 7, the heating member 210 may be a metal pattern patterned on the inner surface of the heat insulation member 120 or 220. Such a metal pattern may have a predetermined width as shown in FIG. 8 and may be formed as a predetermined pattern on the inner surface of the heat insulation member 120 or 220. Accordingly, an area heated by the induction heating when power is applied may be concentrated in a relatively narrow area as compared to the above-described embodiment, and thus uniform heat generation can be implemented.

Such a metal pattern may be formed of a metal such as Cu, Ni, and Cr and may be formed through plating or etching or have a form in which a thin metal member is attached.

The heat insulation member 120 or 220 may be disposed to surround the heating member 110 or 210 and may block the heat, which is generated by the heating member 110 or 210 through the induction heating, from moving outward.

As an example, the heat insulation member 120 or 220 may be made of glass or a polymer resin having insulation properties and heat resistance properties. As a non-limiting example, the heat insulation member 120 or 220 may be made of quartz, sapphire, glass, or the like.

In addition, the heat insulation member 120 or 220 may have heat resistance properties so as to be prevented from being damaged by heat generated by the heating member 110 or 210 and have insulation properties to prevent an electric short from occurring when power is applied to the coil member 130 wound around the outside.

Accordingly, the heat generated in the heating member 110 or 120 through the electromagnetic induction heating by the magnetic field generated by the coil member 130 when the power is applied may be blocked from moving outward through the heat insulation member 120 or 220.

As a result, as the heat generated by the induction heating in the heating member 110 or 210 may be concentrated toward the cigarette 10 inserted into the heating member 110 or 210, the cigarette 10 can be more effectively heated, and the heat can be prevented from being transferred to the user.

For example, as shown in FIGS. 2, 3, and 6, the heat insulation member 120 may have a hollow tubular shape.

Accordingly, the heating member 110 or 210 may be disposed inside the heat insulation member 120, and the coil member 130 may be wound multiple times along the outer surface of the heat insulation member 120.

Meanwhile, the heat insulation member 220 may be configured in the form of a double tube so as to further increase heat insulation properties.

That is, as shown in FIGS. 4, 5, and 7, the heat insulation member 220 may include a first tube 221 having a hollow with a predetermined diameter and a second tube 222 having a diameter relatively larger than the first tube 221, and the second tube 222 may be disposed to surround the first tube 221.

In this case, the second tube 222 may be disposed so that the inner surface thereof is spaced a predetermined interval from an outer surface of the first tube 221. Accordingly, a gap S2 may be formed between the first tube 221 and the second tube 222 and an air layer may be formed in the gap S2.

Accordingly, the heat insulation member 220 may implement the heat insulation effect caused by the air layer formed between the first tube 221 and the second tube 222 as well as a heat insulation effect caused by the material itself, thereby achieving a double heat insulation effect.

As a result, the heat generated by the induction heating in the heating member 110 or 210 may be more concentrated toward the cigarette 10 inserted into the heating member 110 or 210, and thus heat loss can be further reduced.

Here, in a case in which the heat insulation member 220 is configured in the form of a double tube, the first tube 221 and the second tube 222 may be integrally formed with an upper end and a lower end thereof connected to each other, as shown in FIGS. 4 and 7. Alternatively, as shown in FIG. 5, the first tube 221 and the second tube 222 may be formed as two members separated from each other and fixed to each other through the separate fixing member 150.

Meanwhile, in a case in which the heat insulation member 120 or 220 is made of glass having insulation properties and heat resistance properties, the heat insulation member 120 or 220 may further include a glass bead B to further increase the heat insulation properties. The glass bead B may be a hollow cell filled with air. Accordingly, a heat transfer rate of the heat insulation member 120 or 220 may be further reduced through the glass bead B, thereby achieving more excellent heat insulation properties.

Meanwhile, the heater 100, 200, 300, or 400 for a cigarette-type electronic cigarette device according to one embodiment of the present invention may further include a heat radiation coating layer 140 for increasing thermal emissivity when the heating member 110 or 210 emits heat.

The heat radiation coating layer 140 may be formed on one surface of the heating member 110 or 120 exposed to the outside. That is, the heat radiation coating layer 140 may be formed on one side surface facing the cigarette 10 inserted into the heating member 110 or 210.

Accordingly, heat generated by the heating member 110 or 210 when power is applied may be smoothly transferred to the cigarette 10 through the heat radiation coating layer 140 and thus may heat the cigarette 10 in a faster time.

As an example, the heat radiation coating layer 140 may be a coating layer including a heat radiation filler, and the heat radiation coating layer 140 may be a ceramic nano-coating layer.

Here, the heat radiation filler may be a filler having thermal conductivity in addition to heat radiation properties. As a non-limiting example, the heat radiation coating layer 140 may be in the form in which a carbon-based filler, such as graphite or a carbon nanotube (CNT), and a ceramic filler, such as AlN, BN, MgO, and alumina, are mixed.

The heat radiation coating layer 140 may improve the temperature deviation between positions of the heating member 110 or 210 through the heat radiation filler. Accordingly, the heater 100, 200, 300, or 400 for a cigarette-type electronic cigarette device according to this embodiment may be uniformly heated in the entire area facing the cigarette 10 and may be heated to a target temperature within a short time.

Figure 9:
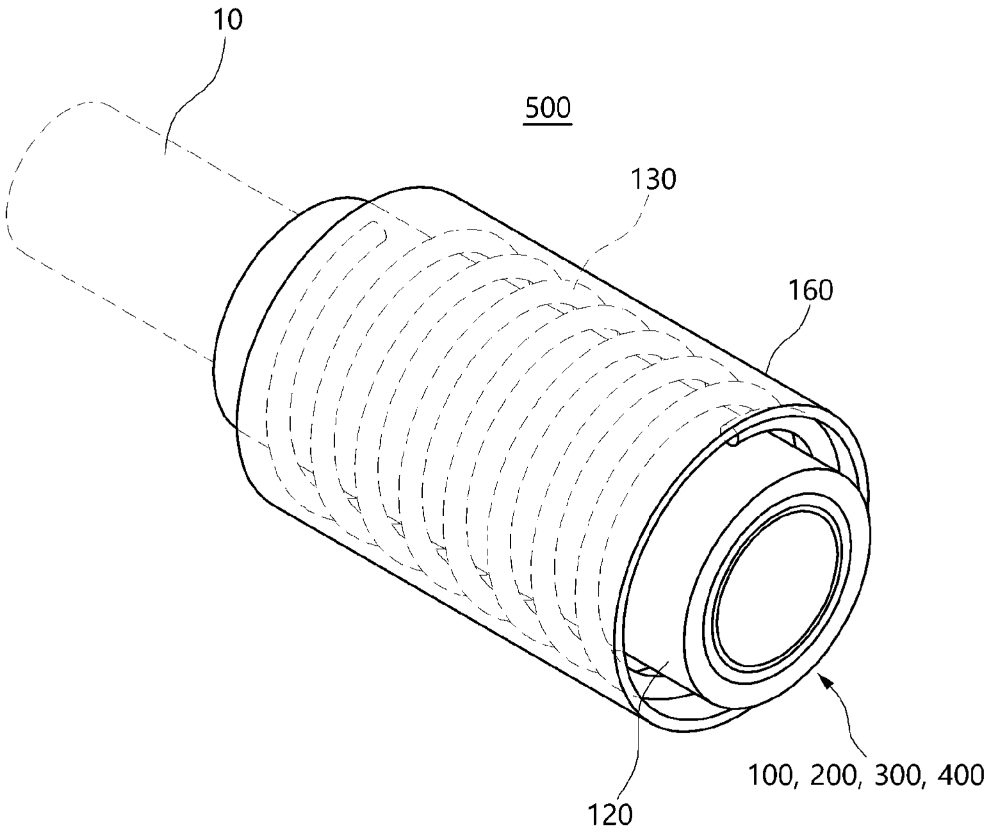
FIG. 9 is a schematic view showing a heater for a cigarette-type electronic cigarette device according to a fifth embodiment of the present invention.

Meanwhile, the heater 500 for a cigarette-type electronic cigarette device according to one embodiment of the present invention may further include a shielding member 160 for shielding a magnetic field generated in the coil member 130 as shown in FIG. 9.

The shielding member 160 may be disposed so as to surround the coil member 130 of the heater 100, 200, 300, or 400 for a cigarette-type electronic cigarette device shown in FIGS. 1 to 8.

Accordingly, the magnetic field generated by the coil member 130 may be shielded through the shielding member 160 and concentrated toward the heating member 110 or 210.

As a result, the eddy current due to the electromagnetic induction by an AC flowing along the coil member 130 may be more smoothly generated in the heating member 110 or 210.

Here, the shielding member 160 may be made of a magnetic material to shield the magnetic field.

As an example, the shielding member 160 may be a well-known shielding sheet, such as a ferrite sheet, a polymer sheet, a ribbon sheet including at least one of an amorphous alloy and a nanocrystalline grain alloy, but the material of the shielding member 160 is not limited thereto, and all known materials used as a shielding material for shielding a magnetic field may be applied.

Further, the shielding member 160 may be a single-layer sheet or may be configured as a multi-layer sheet in which a plurality of sheets are stacked.

In addition, the shielding sheet may be a shielding sheet having flexibility. As a non-limiting example, the shielding sheet may be a sheet divided into a plurality of pieces.

Although the embodiments of the present invention have been described, the spirit of the present invention is not limited to the embodiments presented in the present specification. Those skilled in the art who understand the spirit of the present invention could easily propose other embodiments by adding, changing, deleting, adding, or the like of components within the same scope of the spirit. Further, these other embodiments also belong to the scope of the spirit of the present invention.

The invention claimed is:

1. A heater for a cigarette-type electronic cigarette device, the heater configured to heat a circumferential surface of a cigarette inserted into the cigarette-type electronic cigarette device by a predetermined length, the heater comprising:

a heating member that is disposed to surround the circumferential surface of the cigarette when the cigarette is inserted, wherein the heating member is configured to be heated through an eddy current induced by electromagnetic induction to heat the circumferential surface of the cigarette;

a heat insulation member that is disposed to surround a circumferential surface of the heating member and is configured to block the heat generated by the heating member from moving outward;

a coil member wound multiple times around a circumference of the heat insulation member and that is configured to generate a magnetic field that causes the electromagnetic induction to the heating member when power is applied, and a heat radiation coating layer formed on a surface of the heating member facing the circumferential surface of the cigarette inserted into the heating member, wherein the heat insulation member is disposed between the heating member and the coil member, wherein the heat insulation member includes a first tube having a hollow interior, a second tube disposed to surround the first tube, and an air layer formed between the first tube and the second tube, and wherein the heat radiation coating layer is a coating layer including a heat radiation filler configured to smoothly transfer the heat generated from the heating member to the cigarette while improving temperature deviation between positions on the heating member.

2. The heater of claim 1, wherein the heating member is a hollow metal tube comprising a metal material.

3. The heater of claim 2, wherein the metal tube is made of comprises an iron-based metal.

4. The heater of claim 2, wherein a predetermined gap is formed between an outer surface of the metal tube and an inner surface of the heat insulation member facing the outer surface.

5. The heater of claim 1, wherein the heating member is a metal pattern patterned on an inner surface of the heat insulation member.

6. The heater of claim 1, wherein the heat insulation member comprises heat-resistant glass or a heat-resistant polymer resin.

7. The heater of claim 1, wherein the heat insulation member includes a hollow glass bead.

8. The heater of claim 1, further comprising a shielding member disposed to surround the coil member so as to shield the magnetic field generated by the coil member.

9. A cigarette-type electronic cigarette comprising the heater for a cigarette-type electronic cigarette device of claim 1.

* * * * *